Patented Dec. 5, 1950

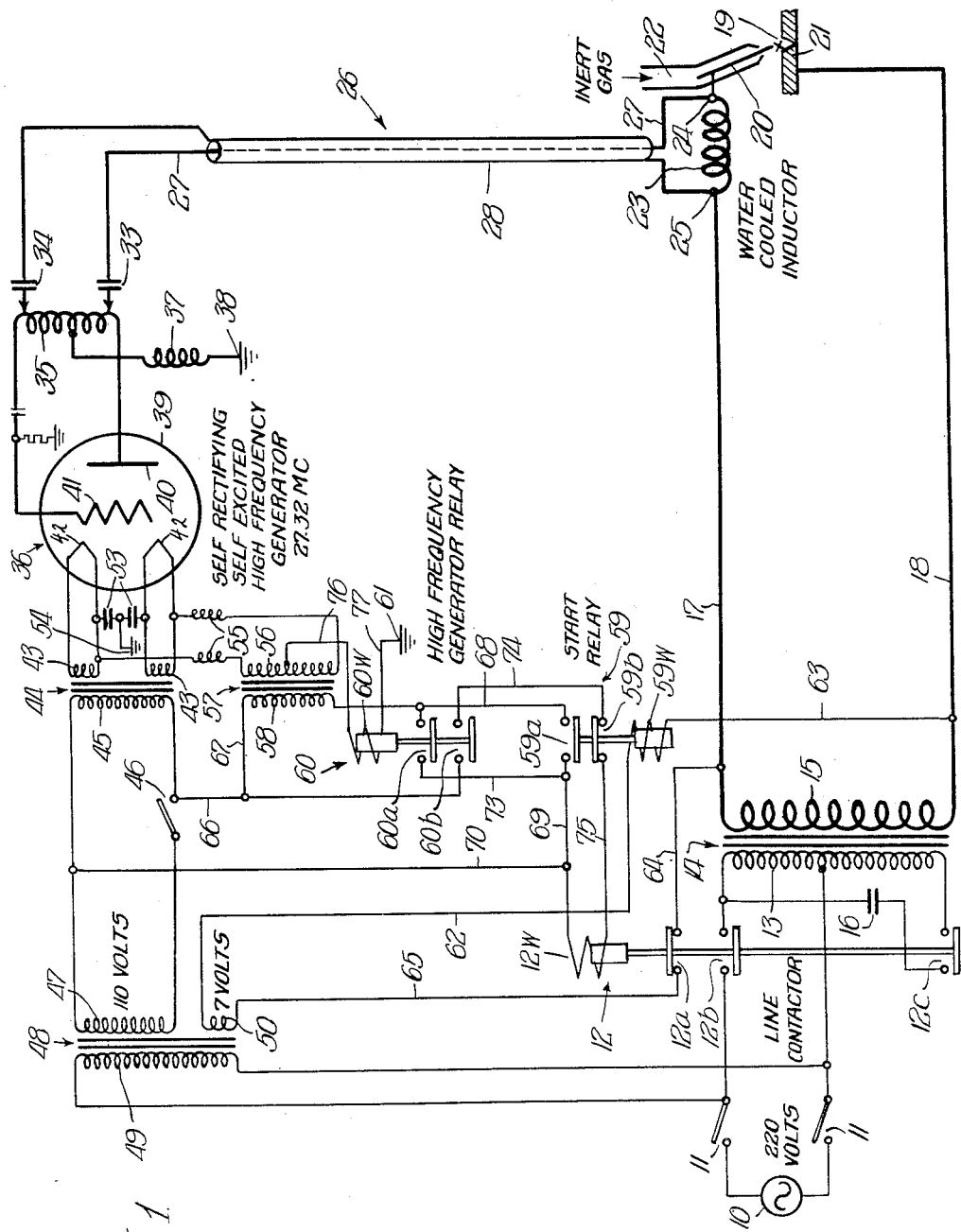

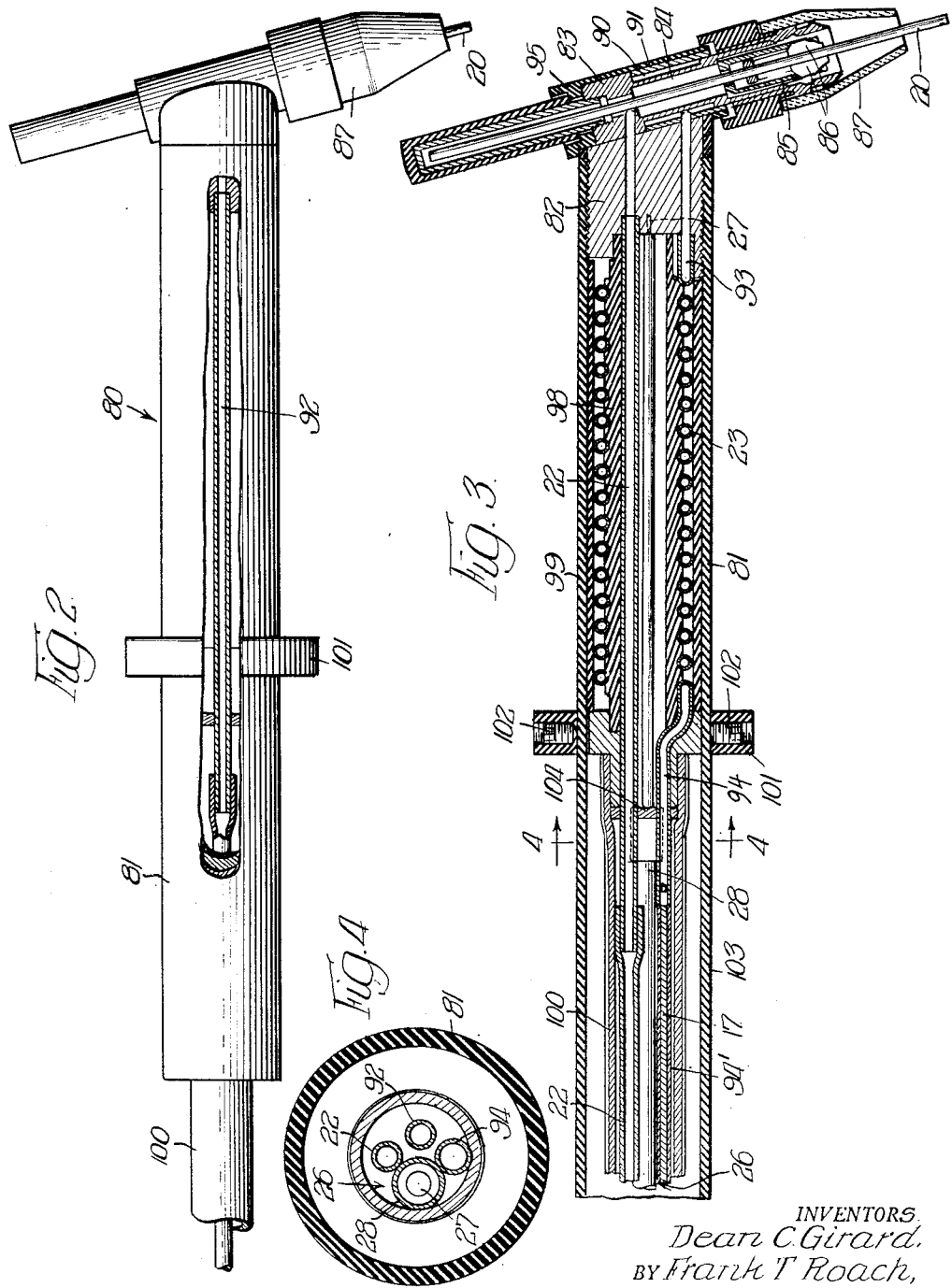

2,532,807

UNITED STATES PATENT OFFICE 2,532,807

ARC-WELDING TORCH

Dean C. Girard, San Leandro, and Frank T. Roach, Hayward, Calif., assignors, by mesne assignments, to National Cylinder Gas Company, a corporation of Delaware Application December 29, 1948, Serial No. 67,794

11 Claims. (Cl. 219—14)

This invention relates, generally, to arc welding systems, and it has particular relation to gas shielded arc welding in which the arc is stabilized by superimposed high frequency.

Among the objects of this invention are: To transmit the stabilizing high frequency to the welding arc with a minimum of loss and maximum efficiency and yet avoid undesirable radio interference; to transmit the stabilizing high frequency in such manner as to avoid overheating of the conductors carrying the same; to employ a co-axial cable for transferring the stabilizing high frequency from the high frequency generator to the arc; to apply the high frequency across an inductor adjacent the arc; to connect the inductor in series with and immediately adjacent to the arc and to pass the welding current therethrough; to connect the inner lead of the co-axial cable to the arc end of the inductor; to position the inductor at the end of an electrode holder with the electrode carried thereby providing one arc terminal; to supply an inert gas through the electrode holder and around the electrode and the arc; and to provide a hand hold on the electrode holder so located as to avoid affecting the application of high frequency to the arc by the presence of the operator's hand.

Other objects of this invention will, in part, be obvious and in part appear hereinafter.

This invention is disclosed in the embodiment thereof shown in the accompanying drawings and it comprises the features of construction, combination of elements, circuit connections, and arrangement of parts which will be exemplified in the description hereinafter set forth and the scope of the application of which will be indicated in the appended claims.

For a more complete understanding of the nature and scope of this invention, reference may be had to the following detailed description, taken together with the accompanying drawings, in which:

Figure 1 illustrates, diagrammatically, the circuit connections which may be employed in practicing this invention and which are disclosed and claimed in application Serial No. 67,795, filed December 29, 1948, now forfeited;

Figure 2 is a view, partly in side elevation and partly in section, of a welding torch and a portion of a composite cable extending therefrom which may be employed in conjunction with the system illustrated in Figure 1;

Figure 3 is a longitudinal sectional view of the welding torch illustrated in Figure 2; and Figure 4 is a detail sectional view, taken along the line 4—4 of Figure 3.

Referring now particularly to Figure 1 of the drawings, it will be observed that the reference character 10 designates a source of alternating current, such as a 220 volt 60 cycle source. It will be understood that other voltages and frequencies can be employed, the particular values specified being for illustrative purposes only. The source 10 may be connected by line switches 11 and a line contactor, shown generally at 12, to energize a primary winding 13 of a welding transformer that is shown, generally, at 14. The welding transformer 14 includes a secondary winding 15 whose open circuit voltage may be of the order of eighty to ninety volts. The line contactor 12 includes an operating winding 12w, normally closed contacts 12a whose function will be described hereinafter, and normally open contacts 12b and 12c. It will be observed that the contacts 12b, when closed, serve to connect the primary winding 13 for energization to the source 10 when the switches 11 are closed. Contacts 12c are provided to connect a capacitor 16 across the primary winding 13 for power factor correction.

The secondary winding 15 of the welding transformer 14 may be connected by conductors 17 and 18 to supply current for maintaining a welding arc 19 between an electrode 20, which may be of the non-consumable type, and work 21 on which the welding operation is to be performed. As will appear hereinafter, inert gas, such as argon, may be supplied through a conduit 22 around the electrode 20 and the arc 19 in accordance with conventional shielded arc welding practice.

Since the welding arc 19 is supplied from the secondary winding 15 of the welding transformer 14 with relatively low frequency alternating current, difficulty is encountered in striking and maintaining the arc. The tungsten electrode 20 should not touch the work 21 except to a very minor extent for it will be contaminated and interfere with proper operation. In order to assist in striking and maintaining the arc provision is made for superimposing on it a current of a relatively high frequency. For this purpose frequencies in the band from 27.16 to 27.48 megacycles have been set aside tentatively. In accordance with the present invention a frequency of 27.32 megacycles has been chosen from this permissible band of frequencies for stabilizing the operation of the arc 19.

Also in accordance with this invention, the stabilizing high frequency is supplied to the arc 19 in close proximity thereto. For this purpose an inductor 23 is connected between the welding electrode 20 and the conductor 17, as shown. The inductor 23 is in the form of a tubular helix and, as will appear hereinafter, is arranged to have a coolant circulated therethrough for the purpose of removing heat from it and also from the parts adjacent the welding electrode 20. The inductor 23 has terminals 24 and 25. It will be noted that the terminal 24 is immediately adjacent the electrode 20 while the terminal 25 provides for connection to the welding lead or conductor 17.

The stabilizing high frequency is applied across the inductor 23 by means of a co-axial cable that is shown, generally, at 26. It will be noted that the inner conductor 27 of the co-axial cable 26 is connected to the terminal 24 of the inductor 23 which is adjacent the electrode 20 and the arc 19. The outer conductor 28 of the co-axial cable 26 is connected to the other terminal 25 of the inductor 23. If desired a variable capacitor may be connected across the inductor 23 to adjust the tuning thereof. It will be understood that the length of the co-axial cable 26 is chosen with respect to the wave length of the stabilizing frequency employed so that the high frequency current is transmitted therethrough with a minimum of loss and a maximum of efficiency. Overheating of the co-axial cable 23 is avoided. At the same time sufficient power is available across the inductor 23 to provide the desired stabilizing effect on the arc 19.

The conductors 27 and 28 which comprise the co-axial cable 26 may be connected through capacitors 33 and 34 to an inductor 35. As illustrated the connections between the capacitors 33 and 34 and the inductor 35 are variable in order to permit adjustment of the tuning as may be required. The inductor 35 forms a part of a self-rectifying self-excited high frequency generator which is indicated, generally, at 36. The inductor 35 has a center tap, as shown, which is connected through a radio frequency choke coil 37 to ground at 38.

The generator 36 includes a double triode electric valve 39 which is of known design and construction. Type 304 TL has been found satisfactory for the purposes of the generator 36. It will be understood, however, that two separate single triode valves can be employed, if desired, in lieu of the double triode electric valve 39 illustrated.

The valve 39 includes an anode or plate 40 and a control grid 41, these being connected, as shown, to the ends of the inductor 35. The valve 39 also includes a pair of hot cathodes 42 which may be heated by secondary windings 43 of a filament transformer, shown generally at 44, which has a primary winding 45.

Any suitable means can be provided for energizing the primary winding 45. As shown, a switch 46 is employed for connecting the primary winding 45 for energization across a secondary winding 47, operating at 110 volts, which forms a part of a transformer, shown generally at 48. The transformer 48 has a primary winding 49 which may be connected for energization across the source 10 when the switches 11 are closed. In addition the transformer 48 has a low voltage secondary winding 50 arranged, as indicated, to operate at about seven volts, and used for a purpose to be described presently.

Capacitors 53 serve to interconnect the hot cathodes 42 and their mid point is connected to ground at 54 in accordance with conventional practice.

As indicated, the generator 36 is of the self-rectifying type. In order to accomplish this, radio frequency choke coils 55 interconnect the circuits to the hot cathodes 42 with a secondary winding 56 of a plate transformer that is indicated, generally, at 57. A primary winding 58 forms another part of the transformer 57 and it is arranged to be connected in a manner to be described presently for energization across the secondary winding 47 of the transformer 48.

It is desirable that the high frequency generator 36 function only during the time that the arc 19 is maintained between the electrode 20 and the work 21. This reduces the likelihood of radio interference since there is none when the generator 36 is not functioning and emission is at a minimum when the arc 19 is being maintained. In order to initiate the generator 36 in operation when it is desired to strike the arc 19 a start relay, shown generally at 59, is provided. The start relay 59 includes an operating winding 59w, normally open contacts 59a and normally closed contacts 59b.

A response to the operation of the high frequency generator 36 may be provided by a high frequency generator relay that is shown, generally, at 60. The relay 60 has an operating winding 60w and normally open contacts 60a and 60b. As shown, the operating winding 60w is connected between a mid point of the secondary winding 56 and ground 61.

In describing the functioning of the system shown in Figure 1, it will be assumed that inert gas is being supplied through the conduit 22 and that the necessary coolant is being circulated through the inductor 23. Also it will be assumed that the switches 11 and 46 have been closed and that the line contactor 12 and relays 59 and 60 are in the deenergized or dropped positions shown in the drawing. The impedance of secondary winding 15 is high enough to prevent energization of the winding 59w therethrough. The operator momentarily touches the electrode 20 on the work 21.

As soon as the electrode 20 engages the work 21 a circuit is completed for energizing the operating winding 59w of the start relay 59. This circuit may be traced from the low voltage secondary winding 50 of the transformer 48, through conductor 62, operating winding 59w, conductor 63, conductor 18, work 21, electrode 20, inductor 23, conductor 17, conductor 64, normally closed contacts 12a and conductor 65 to the other side of the low voltage secondary winding 50. It will be apparent that the operator has to contend here with only a relatively low voltage, for example a voltage of the order of seven volts, which, as far as he is concerned, is entirely harmless.

As soon as the operating winding 59w of the start relay 59 is energized in the manner just described, the circuit to the operating winding 12w of the line contactor 12 is opened at contacts 59b and at contacts 59a a circuit is completed for energizing the primary winding 58 of the plate transformer 57. This circuit may be traced from one terminal of the secondary winding 47 of the transformer 48 through conductors 66 and 67, primary winding 58, conductor 68, contacts 59a and conductors 69 and 70 to the other side of the secondary winding 47. Plate potential now is applied to the valve 39 and sufficient current flows through the operating winding 60w of the generator relay 60 to close its contacts 60a and 60b.

Nothing further happens until the operator withdraws the electrode 20 from the work 21 while maintaining it close thereto so that the arc 19 now provided solely by the high frequency current will continue. However, the previously traced circuit for energizing the operating winding 59w of the start relay 59 is opened and this relay drops. Although contacts 59a are opened by the dropping of start relay 59, the circuit for energizing the primary winding 58 of the plate transformer 57 is maintained through contacts 60a of the generator relay 60. It will be observed that the contacts 59a are connected in parallel with the contacts 60a by conductors 68 and 73.

The dropping of the start relay 59 completes a circuit at 59b for energizing the operating winding 12w of the line contactor 12. This circuit may be traced from one side of the secondary winding 47 of the transformer 48 through conductor 66, contacts 60b, conductor 74, contacts 59b, conductor 75, operating winding 12w and conductor 70 to the other side of the secondary winding 47.

The line contactor 12 now picks up and at contacts 12b and 12c closes the circuits for energizing the primary winding 13 of the welding transformer 14 and connecting the capacitor 16 thereacross. Welding current now is induced in the secondary winding 15 of the welding transformer 14 and it flows through the conductors or welding leads 17 and 18 and the inductor 23 to provide the required current for the arc 19 which now is being stabilized by the superimposed high frequency from the generator 36.

Since contacts 12a are opened when the line contactor 12 is in the operated position, no current can flow through the operating winding 59w of the start relay 59. It will be noted that the winding 60w of the generator relay 60 is connected by a conductor 76 to the mid point of the secondary winding 56 and by a conductor 77 to ground 61.

The welding operation ceases when the operator moves the electrode 20 sufficiently far from the work 21 so that the arc cannot be sustained. This action then unloads the generator 36 to a sufficient extent so that the current flow through the plate circuit is reduced and, as a result, winding 60w of the generator relay 60 is deenergized sufficiently to permit its contacts 60a and 60b to be opened. The previously traced circuit for energizing the primary winding 58 of the plate transformer 57 through contacts 60a is opened and it is deenergized. At contacts 60b the energizing circuit for the operating winding 12w of the line contactor 12 is opened and it drops. The system now is restored to the initially assumed position and, on resumption of welding operations, the cycle just described is repeated.

Referring now particularly to Figures 2, 3 and 4 of the drawings, it will be observed that the reference character 80 designates, generally, a preferred form of gas shielded arc torch which may be employed in conjunction with the system illustrated in Figure 1 and described hereinbefore. The torch 80 includes a hollow cylindrical handle 81 which may be formed of insulating material such as a phenolic condensation product. At its forward end it is provided with a metallic fitting or plug 82 which is joined to a cylindrical metallic housing 83 that extends generally transversely thereof. The housing 83 has a central opening 84 with which the gas inlet 22 communicates for supplying an inert gas around the electrode 20 and the arc 19 in the manner described previously. The inert gas flows through a longitudinally extending passageway 85 around jaws 86 which serve to grip the electrode 20 and provide electrical contact therewith. A conical throat member 87 of suitable heat resisting material, such as lava or porcelain, surrounds the jaws 86 and serves to direct the flow of gas over the electrode 20 and around the arc 19.

It will be noted that the cylindrical metallic housing 83 has an annular recess 90 which is closed by a metallic sleeve 91. This construction provides a cooling chamber through which a coolant, such as water, may be circulated for removing heat from the torch 80. It will be understood that a water inlet conduit 92, Figure 4, communicates with the annular recess 90 for supplying the coolant thereto. The coolant is withdrawn from the annular recess 90 through a conduit 93 and through the inductor 23 which, as shown more clearly in Fig. 3 of the drawings, is in the form of a tubular helix the longitudinal axis of which coincides with the longitudinal axis of the handle 81. A water outlet conduit 94, Figure 4, is connected to the inner end of the tubular inductor 23 and serves to withdraw the coolant therefrom. It will be observed in Figure 3 that the conductor 17, preferably in the form of a stranded conductor or cable, is connected to the inner end of the inductor 23 for supplying welding current therethrough to the electrode 20 through the metallic fitting 82 and cylindrical metallic housing 83. The stranded conductor 17 is positioned inside of a conduit 94' which is connected to the conduit 94. An insulating sleeve 95 surrounds the metallic housing 83, as shown.

Within the outer end of the handle 81 the tubular inductor 23 is mounted on a spirally grooved insulating core 98 and is surrounded by a suitable insulating sleeve 99.

It will be observed that the flexible conductor 17, inert gas conduit 22, the co-axial cable 26, the water inlet conduit 92 and the water outlet conduit 94' are located within a flexible sleeve 100 which extends out of the rear end of the cylindrical handle 81. It will be understood that the portions of the gas conduit 22, co-axial cable 26, and water inlet and outlet conduits 92 and 94' are flexible where they are coextensive with the sleeve 10. These parts are of a length necessary to provide the required connections to the various pieces of apparatus illustrated diagrammatically in Figure 1 and described hereinbefore.

Intermediate the ends of the cylindrical handle 81 there is provided a ring 101 which may be secured in position by set screws 102. The ring 101 serves to separate the forward end of the handle 81 from the rear or hand hold portion 103. It will be noted that the hand hold portion 103 is entirely beyond the inductor 23 or, in other words, is not coextensive therewith. The reason for this is to prevent the hand or hands of the operator from affecting the tuning of the inductor 23 by being placed therearound outside of the portion of the handle 81 which is coextensive therewith.

In Figure 3 the connection of the inner conductor 27 of the co-axial cable 26 to the metallic fitting 82 is shown. The outer conductor 28 of the co-axial cable 26 is connected to the inner end of the inductor 23 by a plate 104. Thus, as previously described, the conductors which comprise the co-axial cable 26 are connected across the inductor 23 with the inner conductor 27 being connected to the end thereof which is immediately adjacent the welding electrode 20.

Since certain changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. For combination in an arc welding system wherein the arc is a low frequency alternating current arc and is stabilized by high frequency current of the order of several megacycles superimposed thereon, an inductor in substantially as close proximity to the arc as it is physically possible to position the same, and circuit means consisting of a non-radiating transmission line for connecting said inductor for energization across the high frequency current source.

2. For combination in an arc welding system wherein the arc is a low frequency alternating current arc and is stabilized by high frequency current of the order of several megacycles, superimposed thereon, an inductor in substantially as close proximity to the arc as it is physically possible to position the same, circuit means for connecting said inductor in series with the welding current source, and circuit means consisting of a non-radiating transmission line for connecting said inductor for energization across the high frequency current source.

3. For combination in an arc welding system wherein the arc is a low frequency alternating current arc and is stabilized by high frequency current of the order of several megacycles superimposed thereon, an inductor formed by a tubular helix in substantially as close proximity to the arc as it is physically possible to position the same, circuit means for connecting said inductor in series with the welding current source, means connected to said tubular helix to cause a coolant to flow therethrough, and circuit means consisting of a non-radiating transmission line for connecting said inductor for energization across the high frequency current source.

4. For combination in an arc welding system wherein a low frequency arc is stabilized by superimposed high frequency of the order of several megacycles, an inductor in series with the arc and in substantially as close proximity to the arc as it is physically possible to position the same through which the low frequency flows, and a non-radiating co-axial cable tuned to said frequency for connecting said inductor across a source of high frequency, the inner electrode of said cable being connected to said inductor adjacent the arc.

5. For combination in an arc welding system wherein a low frequency arc is stabilized by superimposed high frequency of the order of several megacycles, an inductor formed by a tubular helix in series with the arc and in substantially as close proximity to the arc as it is physically possible to position the same through which the low frequency flows, means connected to said tubular helix to circulate a coolant therethrough, and a non-radiating co-axial cable tuned to said frequency for connecting said inductor across a source of high frequency, the inner electrode of said cable being connected to said inductor adjacent the arc.

6. For combination in a low frequency alternating current circuit an inductor in the form of a tubular helix through which the low frequency alternating current flows, non-magnetic insulating means supporting said inductor, circuit means connecting said inductor across a source of high frequency current of the order of several megacycles whereby the same flows through the outermost part thereof, and means connected to said tubular helix to cause a coolant to flow therethrough.

7. A gas arc torch for welding with an electrode comprising, in combination, a tubular handle of insulating non-magnetic material, means for mounting the electrode at one end of said handle, a conduit extending through said handle to supply a gas around said electrode and the arc, an inductor within said handle at said one end with its outer end connected to said electrode and its inner end for connection to one terminal of a low frequency alternating current source, non-magnetic insulating means supporting said inductor, and circuit means extending through said handle for connecting said inductor for energization across a source of high frequency current of the order of several megacycles to stabilize the low frequency arc.

8. The invention, as set forth in claim 7, wherein the handle extends beyond the inductor sufficiently far to provide a hand hold.

9. The invention, as set forth in claim 7, wherein the inductor is in the form of a tubular helix, and inlet and outlet conduits extend through the handle and connect to opposite ends of said helix for circulating a coolant therethrough.

10. The invention, as set forth in claim 7, wherein the circuit means is a co-axial cable with the inner lead connected to the inductor adjacent the electrode.

11. In combination, a gas arc torch for welding with an electrode, a tubular handle for carrying said electrode at one end; a composite cable extending from the other end of said handle including a conduit for supplying a gas around said electrode and the arc, a welding current conductor, a co-axial cable, and inlet and outlet coolant conduits; and an inductor in the form of a tubular helix carried by said handle adjacent said electrode with one end connected thereto, said welding current conductor being connected to the other end of said inductor, said co-axial cable being connected across said inductor with the inner lead connected to the electrode end, said coolant conduits being connected to the ends of said tubular helix.

DEAN C. GIRARD.
FRANK T. ROACH.

REFERENCES CITED

The following references are of record in the file of this patent:

UNITED STATES PATENTS

| Number | Name | Date |
|---|---|---|
| 1,973,122 | Stoddard | Sept. 11, 1934 |
| 1,982,327 | Smith | Nov. 27, 1934 |
| 2,036,233 | Pakala | Apr. 7, 1936 |
| 2,093,821 | Southgate | Sept. 21, 1937 |
| 2,336,177 | Howard et al. | Dec. 7, 1943 |

OTHER REFERENCES

"The Welding Journal," May 1947, page 411.